United States Patent
Harrison

(10) Patent No.: US 9,973,532 B2
(45) Date of Patent: May 15, 2018

(54) SECURE CONTROL OF INSECURE DEVICE

(71) Applicant: Garrison Technology Ltd, London (GB)

(72) Inventor: Henry Harrison, London (GB)

(73) Assignee: Garrison Technology LTD, London (GB)

( * ) Notice: Subject to any disclaimer, the term of this patent is extended or adjusted under 35 U.S.C. 154(b) by 66 days.

(21) Appl. No.: 15/053,306

(22) Filed: Feb. 25, 2016

(65) Prior Publication Data

US 2016/0261634 A1    Sep. 8, 2016

(30) Foreign Application Priority Data

Mar. 6, 2015 (GB) .................................. 1503827.6

(51) Int. Cl.
| | |
|---|---|
| *G06F 21/82* | (2013.01) |
| *H04L 29/06* | (2006.01) |
| *H04L 29/08* | (2006.01) |
| *G06F 3/14* | (2006.01) |

(52) U.S. Cl.
CPC ............ *H04L 63/18* (2013.01); *G06F 3/1454* (2013.01); *G06F 21/82* (2013.01); *H04L 67/125* (2013.01); *H04L 63/0209* (2013.01); *H04L 63/162* (2013.01)

(58) Field of Classification Search
CPC ... H04L 63/18; H04L 63/162; H04L 63/0209; H04L 67/125; G06F 21/82; G06F 3/1454
See application file for complete search history.

(56) References Cited

U.S. PATENT DOCUMENTS

| | | | |
|---|---|---|---|
| 6,621,499 B1 * | 9/2003 | Callway ................. | G09G 5/395 345/629 |
| 8,839,417 B1 | 9/2014 | Jordan | |
| 2007/0274400 A1 * | 11/2007 | Murai ............... | H04N 21/23430 375/240.26 |
| 2008/0008207 A1 | 1/2008 | Kellum | |

(Continued)

FOREIGN PATENT DOCUMENTS

| | | |
|---|---|---|
| CN | 104363231 | 2/2015 |
| EP | 2 706 723 | 3/2014 |
| EP | 2706723 | 3/2014 |

*Primary Examiner* — Beemnet Dada
(74) *Attorney, Agent, or Firm* — Occhiuti & Rohlicek LLP

(57) ABSTRACT

A computer system for securely controlling an insecure computer is provided. The system comprises an insecure computer, a secure computer and a unidirectional dataflow enforcer. The insecure computer comprises a dedicated video output with a hardware interface, and is configured to transmit its video output to a secure computer over a first connection and to receive instructions for controlling the insecure computer over a second connection. The secure computer is configured to receive the video output of the insecure computer over the first connection and to transmit instructions for controlling the insecure computer over the second connection. The unidirectional dataflow enforcer is configured to enforce unidirectional dataflow between the secure computer and the insecure computer, such that dataflow from the secure computer to the insecure computer over the second connection is allowed, but dataflow from the insecure computer to the secure computer over the second connection is prevented. A corresponding method is also provided.

31 Claims, 3 Drawing Sheets

(56) References Cited

U.S. PATENT DOCUMENTS

| | | |
|---|---|---|
| 2008/0301799 A1 | 12/2008 | Arnold et al. |
| 2009/0213939 A1 | 8/2009 | Jung et al. |
| 2009/0213940 A1 | 8/2009 | NepomucenoLeung et al. |
| 2009/0252227 A1 | 10/2009 | NepomucenoLeung et al. |
| 2010/0043047 A1 | 2/2010 | Archer et al. |
| 2011/0085602 A1 | 4/2011 | He |
| 2013/0058394 A1 | 3/2013 | Nilsson et al. |
| 2014/0075535 A1* | 3/2014 | Soffer ................ H04L 63/0227 726/13 |
| 2014/0136657 A1 | 5/2014 | Mraz |
| 2015/0264056 A1 | 9/2015 | Mevec et al. |
| 2015/0264359 A1 | 9/2015 | Vanam et al. |

\* cited by examiner

SECURE CONTROL OF INSECURE DEVICE

CROSS-REFERENCE TO RELATED APPLICATION

This application claims priority, under 35 U.S.C. 119(a), to UK application no. GB 1503827.6, filed on Mar. 6, 2015, incorporated herein by reference.

TECHNICAL FIELD

The invention relates to the remote control of an insecure device, and particularly to a computer system and method for securely controlling an insecure computer.

BACKGROUND

Remote desktop software is widely used to provide the user of a local, client computing device with the resources and functionality available to a second, remote computing device. The software typically allows the user to access and control the desktop environment of the remote computer using the client computer by providing the client computer with a view of the user interface of the remote computer, and by transmitting user input from the client computer to the remote computer.

There are a number of applications of remote desktops. For example, employees who wish to work from home, or while they are otherwise out of their office, can use the software to access their office desktop environment. Alternatively, now that cloud computing is widely available, many people access software and other resources that are stored on servers in data centres. As another example, IT support staff may use remote desktop software to take control of a user's desktop to provide troubleshooting. Frequently used remote desktop software for such applications include Citrix® and Apple® Remote Desktop.

Remote desktop software operates through a client/server model. A client component of the remote desktop software is installed on the client computer, and a server component of the software is installed on the remote computer. If the client computer is connected to the remote computer through a network, the client and server components of the software can communicate. This necessarily involves bidirectional communication over the network, with the view of the desktop environment of the remote computer being transmitted over the network in one direction, and user input being transmitted over the network in the other direction.

While known remote desktop software is adequate in many situations, security may be a concern. This is especially the case where the client computer is a relatively secure computer, while the remote computer is relatively insecure. If an insecure remote computer is connected to the internet and has been compromised by a third party, or is running malicious software, it may represent an unacceptable risk to the secure computer. For example, the malicious software may be able to craft communications to the secure device over the network, thus gaining control over the secure device.

It is an object of embodiments of the present invention to provide for the control of an insecure computer from a secure computer, with the security of the secure computer guaranteed.

SUMMARY OF THE INVENTION

The invention is defined in the independent claims to which reference is now directed. Preferred features are set out in the dependent claims.

According to a first aspect of the invention there is provided a computer system for providing secure control of a computer, the system comprising an insecure computer, a secure computer and a unidirectional dataflow enforcer. The insecure computer comprises a dedicated video output with a hardware interface, and is configured to transmit the video output to the secure computer over a first connection. The insecure computer is further configured to receive instructions for controlling the insecure computer over a second connection. The secure computer is configured to receive the video output from the insecure computer over the first connection, and is further configured to transmit instructions for controlling the insecure computer over the second connection. The unidirectional dataflow enforcer is configured to enforce unidirectional dataflow between the secure computer and the insecure computer, such that dataflow from the secure computer to the insecure computer is allowed, but dataflow from the insecure computer to the secure computer is prevented.

Providing the system with a unidirectional dataflow enforcer, which allows dataflow from the secure computer to the insecure computer but prevents dataflow from the insecure computer to the secure computer, allows the secure computer to control the insecure computer without any risk of the insecure computer compromising the secure computer using the connection over which the unidirectional dataflow enforcer is implemented. At the same time, providing the secure computer with the video output of the insecure computer gives the secure computer a view of the screen image of the insecure device, which is necessary to provide effective control, but the dedicated, hardware implemented nature of the video output eliminates any risk of the insecure computer compromising the secure computer over the video connection. This is because it is not possible for software instructions to modify the way in which the video output is communicated over the dedicated video output, which is typically only capable of transmitting raw, uncompressed bitmap data of a screen image. The computer system therefore provides for the secure control of an insecure computer.

It will be understood that the terms "secure computer" and "insecure computer" are relative terms, and are not intended to limit the invention to any particular hardware or software configuration. A secure computer in the context of the present invention may be one in which the user has, and takes steps to maintain, a high level of confidence that there is no malicious software running on the computer. An insecure computer may be one in which the user has a lower confidence, and may accept that there is a possibility that malicious software could be running on the computer. A user may take a variety of steps to secure a computer, including hardware steps, such as limiting the types of connections to and from the computer, and software steps, such as using a firewall or a dedicated, cryptographically secured communication protocol.

The term "screen image" of the insecure computer will be understood to refer to an image of the operating system interface display of the insecure computer. A view of the screen image allows a user to interface with the insecure computer, since the user can see the operating system interface and determine appropriate inputs, and see the results of the inputs.

The unidirectional dataflow enforcer may be implemented in hardware, software, or a combination of hardware and software. What is important is that malicious instructions from the insecure computer are not able to craft communications to the secure computer by disabling or bypassing the unidirectional dataflow enforcer.

Dedicated hardware implementations of the unidirectional dataflow enforcer have the advantage that the hardware does not allow instructions to flow from the insecure computer to the secure computer. Dedicated hardware implementations include a unidirectional optical link comprising optical transmission hardware, which may be a laser, and optical receiver hardware; a unidirectional electronic transmission connection, such as one connection of a serial port link that uses different electrical connections for each direction of communication; or a custom electronic device such as an application-specific integrated circuit (ASIC) or programmable logic device (PLD) in which the functionality is physically hardwired.

Combined hardware and software implementations include custom electronic devices, such as ASICs and PLDs in which the unidirectional dataflow functionality is not physically hardwired, but in which the hardware can only access software stored in read only memory (ROM) or programmable ROM (PROM), which cannot be altered without accessing the internals of the device. Combined hardware and software implementations have the advantage of a combination of high security and relative ease of implementation of additional functionality.

Pure software implementations have the advantage that it is relatively easy to implement additional functionality. The software may be stored and executed on the secure computer or on an intermediate computing platform.

In some implementations, the unidirectional dataflow enforcer may have additional functionality. The unidirectional dataflow enforcer may be able to monitor the instructions that are transmitted across the second connection. Monitoring may involve producing a log of instructions sent across the link, and may involve transmitting the log to the secure computer. Monitoring instructions may be helpful in identifying any evidence of the second connection being used to leak sensitive information.

The computer system may further comprise a converter to convert the video output of the insecure computer to a form that the secure computer can receive. The secure computer may receive the video output of the insecure computer through a camera input port of the secure computer.

The dedicated video output of the insecure computer may be one of the following interface technologies: VGA, DVI, HDMI, DisplayPort or DSI.

In one embodiment the secure computer may be further configured to transmit the video output to a second secure computer over a third connection, and to receive instructions for controlling the insecure computer from the second secure computer over the third connection. The second secure computer may be part of the computer system, and may be configured to receive the video output of the insecure computer from the secure computer over the third connection. The second secure computer may be further configured to transmit instructions, for controlling the insecure computer, to the secure computer over the third connection.

The embodiment involving a second secure computer may be particularly advantageous in implementations involving a data centre or the like. A single secure computer in a data centre may be used to serve a plurality of second secure computers located outside of the data centre, since there is no requirement for the secure computer to include output means, such as a monitor, or input means, such as a keyboard or mouse, as these could be coupled to the plurality of second secure computers.

In implementations involving a second secure computer, the secure computer may be further configured to compress the video output before forwarding it to the second secure computer. This has the advantage of reducing bandwidth requirements.

In some implementations, the insecure computer may be further configured to transmit audio output to the secure computer over the first connection. References to a dedicated video output of the insecure computer may therefore also be considered as references to a dedicated video and audio output.

In some implementations, the instructions for controlling the insecure computer are user instructions input on one or more input devices.

A corresponding method of securely controlling a computer may be provided. The method comprises transmitting a video output from an insecure computer having a dedicated video output with a hardware interface to a secure computer over a first connection. The method further comprises enforcing unidirectional dataflow between the secure computer and insecure computer by allowing dataflow from the secure computer to the insecure computer over a second connection, and by preventing dataflow from the insecure computer to the secure computer over the second connection. The method further comprises receiving, from the secure computer, at the insecure computer, over the second connection, instructions for controlling the insecure computer.

BRIEF DESCRIPTION OF THE DRAWINGS

The invention will now be further described by way of example only and with reference to the accompanying figures in which.

DETAILED DESCRIPTION

Figure 1:
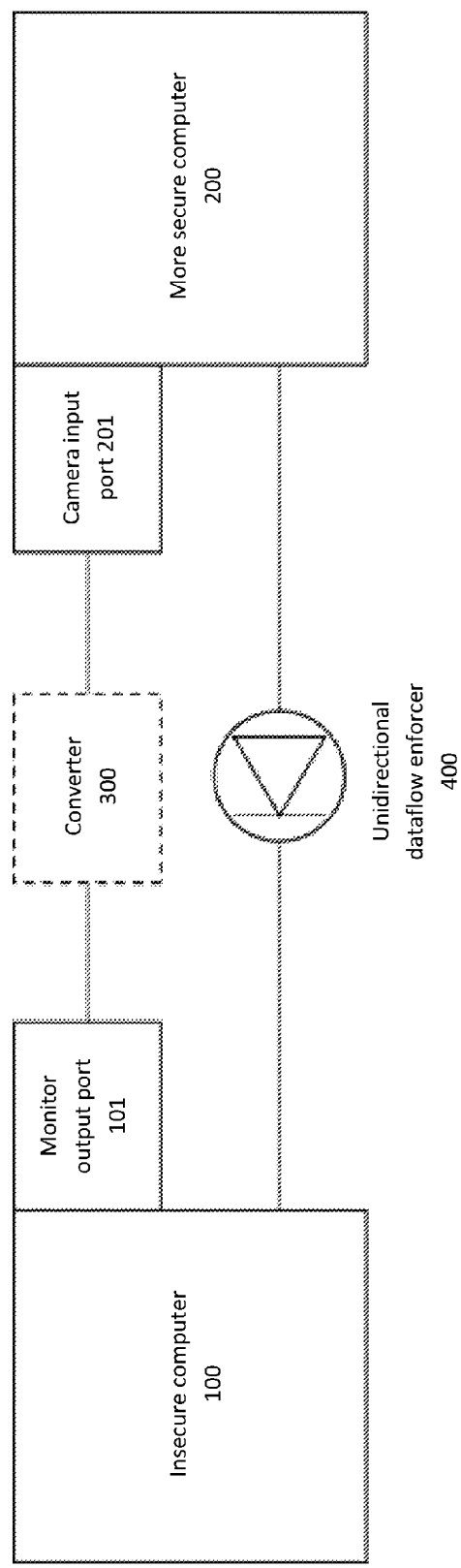
FIG. 1 is a schematic diagram of a computer system according to an embodiment of the invention.

FIG. 1 shows a first computer (100) that is controlled by a second computer (200) via a unidirectional dataflow enforcer (400). The second computer (200) is more secure than the first computer (100). For reference purposes the first computer (100) will be referred to as the insecure computer (100) and the second computer (200) will be referred to as the secure computer (200).

The insecure computer (100) will include a dedicated video output with a hardware interface (101). This output (101) provides an output of a screen image that is generated by the insecure computer (100). The video output is typically in the form of uncompressed bitmap data, which may be encapsulated into a digital communications protocol. Insecure computer (100) is configured to transmit the video output over a first connection, which may be a wired or wireless connection. Insecure computer (100) is also configured to receive instructions for controlling the insecure computer (100) from the secure computer (200) over a second connection, as discussed further herein.

The secure computer (200) is configured for receiving the video output of the insecure computer (100) from the insecure computer (100) over the first connection. The secure computer (200) may include a camera input port (201), or other known hardware, to receive the video output of the insecure computer (100) over the first connection. The secure computer (200) is further configured to transmit instructions for controlling the insecure computer (100) over the second connection.

The computer system includes a unidirectional dataflow enforcer (400) which is configured to enforce unidirectional dataflow between the secure computer (200) and the insecure computer (100) over the second connection. The unidirectional dataflow enforcer (400), which may be implemented in hardware, software, or a combination of the two, allows dataflow from the secure computer (200) to the insecure computer (100), but prevents dataflow from the insecure computer (100) to the secure computer (200).

In use, the insecure computer (100) will generate video output. For example, the insecure computer (100) may be connected to the internet and be receiving video content from a server hosting a webpage. The insecure computer (100) will then generate a screen image using a graphics processing unit and possibly audio, based at least in part on the content, and transmit the screen image over the first connection via the dedicated video output with a hardware interface (101). The secure computer (200) will then receive the video output of the insecure computer (100) over the first connection, whether by camera input port (201) or otherwise.

Because dedicated video output (101) is implemented in hardware, with signals generated over the interface generated by a dedicated single function controller, rather than by general software, malicious software or instructions cannot affect the way that the screen image is communicated over the first connection. Malicious software may be able to affect the appearance of the screen image, but cannot affect how it is communicated. As such, any malicious control of the insecure computer (100), or any malicious software running on the insecure computer (100), does not represent a security risk to the secure computer (200) in respect of the first connection.

In some cases the insecure computer (100) may also generate audio output. The insecure computer (100) may then be configured to transmit the audio output to the secure computer (200), in addition to the video output, via a dedicated, hardware implemented, output.

The secure computer (200) will deliver the video output of the insecure computer (100) to a user, for example through a monitor. Since the user can see the screen image of the insecure computer (100), they can determine and input appropriate instructions for controlling the insecure computer (100). Such instructions may be input using a mouse, keyboard or touch screen connected to the secure computer (200), for example. These instructions are then transmitted to the insecure computer (100) over the second connection.

Unidirectional dataflow enforcer (400) allows dataflow from the secure computer (200) to the insecure computer (100) over the second connection. The instructions transmitted by the secure computer (200) for controlling the insecure computer (100) are therefore allowed to pass through the unidirectional dataflow enforcer (400) to the insecure computer (100), where they are received.

The instructions received by the insecure computer (100) will then be processed to affect the control of the insecure computer (100) by the secure computer (200).

Since the unidirectional dataflow enforcer (400) prevents dataflow from the insecure computer (100) to the secure computer (200), the insecure computer (100) cannot use the second connection as a means to compromise the secure computer (200). Malicious control of, or malicious software running on, the insecure computer (100) does not, therefore, represent a security risk to the secure computer (200).

The computer system therefore allows for the secure control of an insecure computer (100). The secure computer (200) is able to provide instructions to control the insecure computer (100) over one connection, and is able to receive video output of the screen image of the insecure computer (100) over another connection. However, due to the presence of the unidirectional dataflow enforcer (400) on one connection, and due to the dedicated, hardware implemented nature of output of the insecure computer, the insecure computer (100) cannot compromise the security of the secure computer (200).

The dedicated video or video and audio output of the insecure computer (100) may be any appropriate interface technology. For example, the video output may use a technology such as VGA, DVI, HDMI, DisplayPort or DSI. Where there is also audio, the output may be combined with the video, as in HDMI, or there may be a separate, dedicated, hardware implemented, audio output that uses a separate connection.

As previously mentioned, secure computer (200) may have a camera input port (201), or other known hardware, to receive the video output of the insecure computer (100) over the first connection. In some implementations, it may be necessary to convert the video or video and audio output of the insecure computer (100) into a form that the secure computer (200) can receive, whether by the camera input port (201) or otherwise. Where this is the case, the system can include a converter (300). The converter (300) may be part of, or be coupled to, the insecure computer (100) or the secure computer (200), or may form part of the first connection. In some implementations, the camera input port (201) may be a MIPI CSI-2 camera input port, and the converter may have an HDMI input and CSI-2 output. In other implementations, rather than a camera input port, the secure computer (200) may have a generic interface such as USB, and the converter may have an HDMI input and a generic output, such as according to the USB standard. Since the security of the video output is guaranteed by the dedicated video output with a hardware interface (101), the precise details of how the video output is received by the secure computer (200) may not matter.

Figure 2:
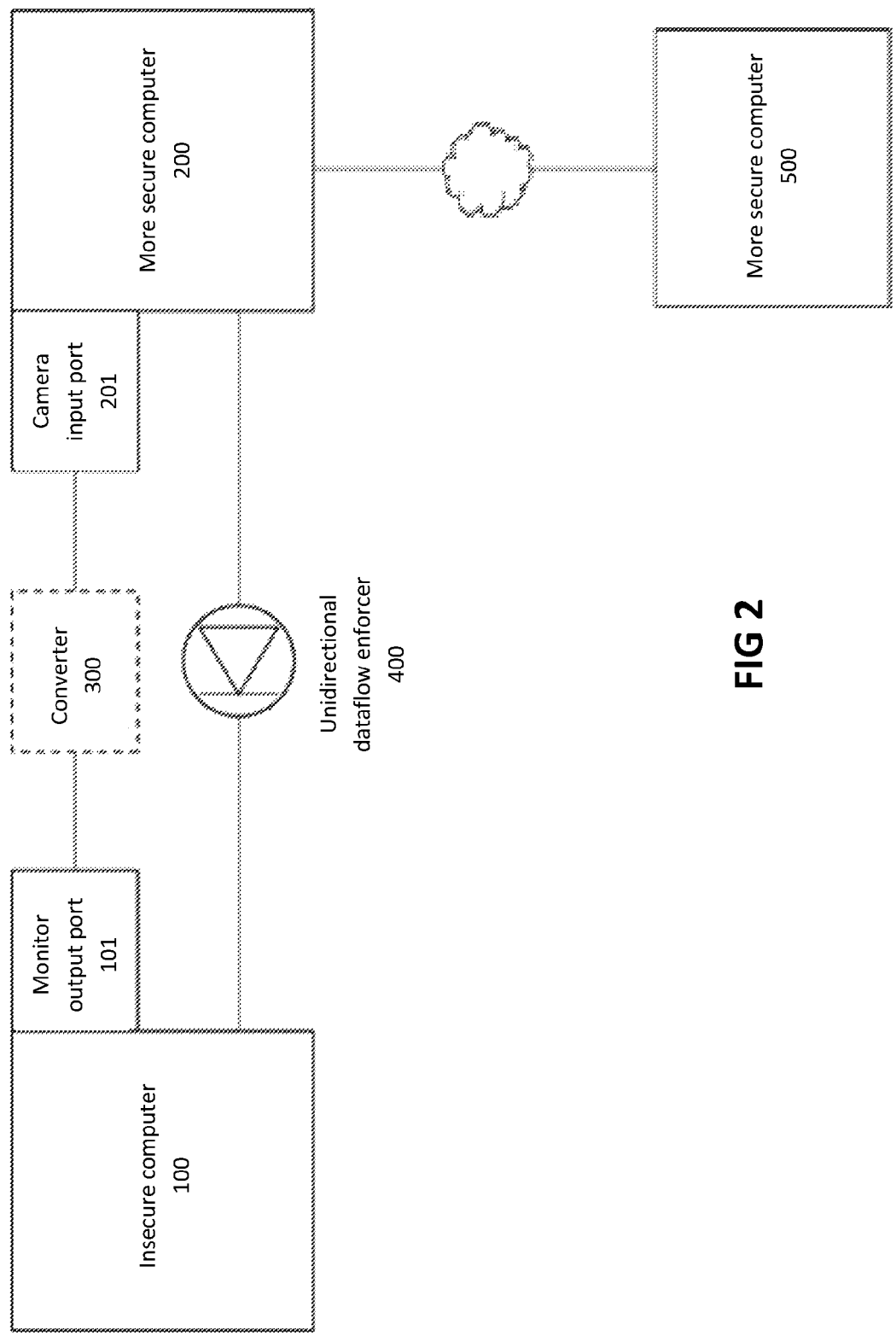
FIG. 2 is a schematic diagram of a computer system according to a second embodiment of the invention.

FIG. 2 shows a second embodiment according to the invention in which the objective is to allow a third computer (500) to securely control the insecure computer (100). The third computer (500) is relatively secure compared to the insecure computer (100), and may be secured to the same level as the secure computer (200). For reference purposes, computer (200) will be referred to as the first secure computer and computer (500) will be referred to as the second secure computer.

The insecure computer (100) has the same configuration as the insecure computer (100) of FIG. 1. It includes a dedicated, hardware implemented, video or video and audio output (101), and is configured to transmit the video or video and audio output to the first secure computer (200) over the first connection. The insecure computer (100) is further configured to receive instructions for controlling the insecure computer (100) from the first secure computer (200) over the second connection.

The first secure computer (200) is configured to receive the video, or video and audio, output from the insecure computer (100) over the first connection and to transmit it to the second secure computer (500) over a third, secure, connection. The first secure computer (200) is further configured to receive instructions for controlling the insecure computer (100) from the second secure computer (500) over the third connection and to transmit the instructions to the insecure computer (100) over the second connection.

The second secure computer (500) is configured to receive the video or video and audio output of the insecure computer (100) from the secure computer (200) over the third connection. The second secure computer (500) is further configured to transmit instructions for controlling the insecure computer (100) to the secure computer (200) over the third connection.

The system also includes a unidirectional dataflow enforcer (400), configured as described in the embodiment of FIG. 1.

In some implementations of the embodiment of FIG. 2, it is not necessary for the first secure computer (200) to be coupled to any means for inputting user instructions, such as keyboard or mouse, as the secure computer (200) receives the instructions for controlling the insecure computer (100) from the second secure computer (500). Likewise, it may not be necessary for the first secure computer (200) to be coupled to any means to output the screen image, such as a monitor, as the video or video and audio output is transmitted to the second secure computer (500).

The first and second secure computer may communicate over a secure network. The third, secure, connection may be a dedicated network connection between the second secure computer (500) and the first secure computer (200), such as a wired or wireless connection. The first secure computer (200) and the second secure computer (500) may be connected as part of a local area network (LAN) or as part of a wide area network (WAN). The connection may also be a VPN connection established over the internet, or even a normal internet connection if measures have been taken to secure the connection to a level acceptable to the user. Measures may include locating the computers behind firewalls which only allow communication to specific IP addresses, or using a dedicated communication protocol secured by cryptography, such as TLS or SSL, for communication between the two secure computers.

In one implementation of the embodiment of FIG. 2, the second secure computer (500) is a computer operated by an employee or the like, while the first secure computer (200) and the insecure computer (100) are located in a data centre. The first secure computer (200) effectively acts as a secure interface between the second secure computer (500) and the insecure computer (100), and the system allows the user of the second secure computer (500) to securely access potentially insecure content by viewing the screen image of the insecure computer (100) over connections that are guaranteed to be secure.

In some implementations, the first secure computer (200) may encode or compress the video, or video and audio, data using some form of video/audio compression before transmitting it to the second secure computer (500). This can help minimise bandwidth requirements.

Figure 3:
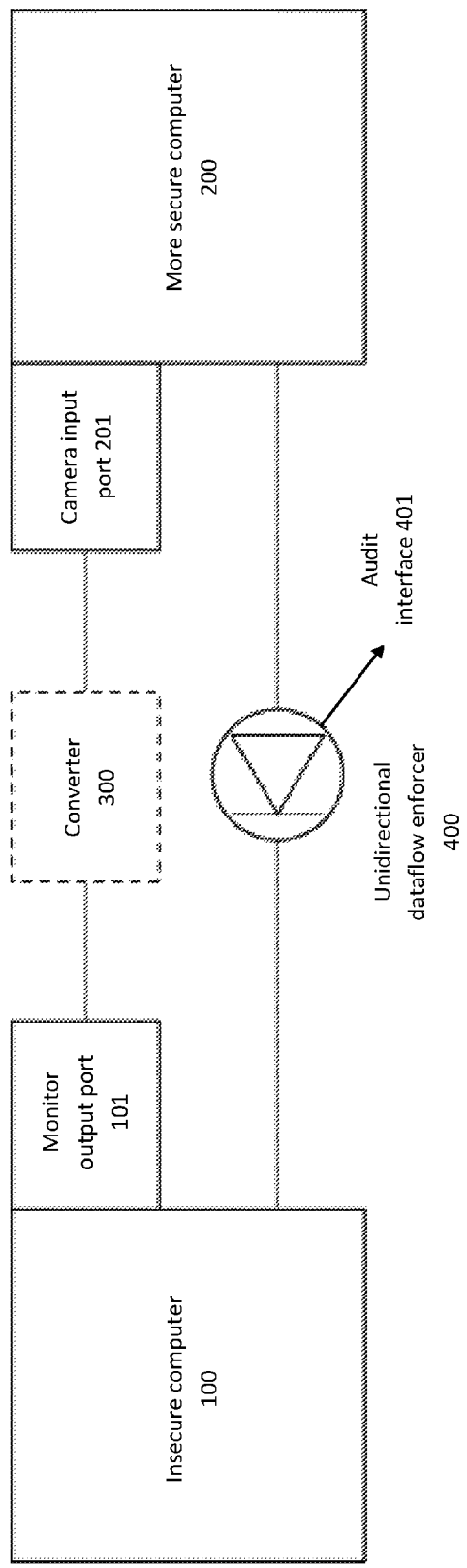
FIG. 3 is a schematic diagram of a computer system according to a third embodiment of the invention.

FIG. 3 shows a third embodiment of the invention in which the unidirectional dataflow enforcer (400) has additional functionality. FIG. 3 illustratively shows this in accordance with the embodiment of FIG. 1, but it will be understood that the additional functionality described herein could be also implemented in accordance with the embodiment of FIG. 2.

In the embodiment of FIG. 3, unidirectional dataflow enforcer (400) includes audit interface (401). Audit interface (401) may be any appropriate means for implementing the relevant functionality, and may be implemented by hardware, software, or a combination of the two.

One example of the functionality that could be implemented by audit interface (401) is the auditing of instructions that are transmitted across the second connection. For example, audit interface (401) may audit instructions corresponding to user inputs via input devices, including mouse clicks and keyboard strokes, and may be helpful in identifying any evidence of the second connection being used to leak sensitive information. Auditing may involve producing a log of all instructions sent across the link, typically for real-time or subsequent analysis. The log or associated information may be transmitted to the first secure computer (200), the second secure computer (500) or another computer, over a fourth connection, which may be a dedicated connection.

As mentioned previously, unidirectional dataflow enforcer (400) and the optional auditing interface (401) may be implemented as hardware, software or a combination of the two.

Further, unidirectional dataflow enforcer (400) may be implemented on one, the other, or both of secure computer (200) and insecure computer (100). Various implementations of a unidirectional dataflow enforcer, sometimes referred to as a "data diode", are possible, and some exemplary implementations will now be described.

In one implementation which is considered particularly secure, unidirectional dataflow enforcer (400) is implemented in hardware using an optical link. In this implementation, secure computer (200) includes, or is coupled to, optical transmission hardware, such as a laser, and insecure computer (100) includes a corresponding optical receiver. This allows the transmission of instructions from the secure computer (200) to the insecure computer (100), but because the insecure computer (100) does not include an optical transmitter, and secure computer (200) does not include an optical receiver, it is not physically possible for data to flow from the insecure computer (100) to the secure computer (200). It will be understood that this implementation could make use of a medium for carrying the optical signal, such as an optical fibre. Alternatively, there may not be such a medium, in which case a line of sight between the transmitter and receiver may be necessary.

In an alternative hardware implementation, the unidirectional dataflow enforcer (400) is one electrical transmission connection of a connection that uses different electrical connections for each direction of communication. For example, the connection may be one connection of a serial port according to the RS-232 standard. Data can flow in one direction, from the secure computer (200) to the insecure computer (100), but the hardware controlling the RS-232 link would not allow data to flow in the opposite direction.

A further approach typically considered to be high-security is to create a low level custom electronic hardware device, such as an application-specific integrated circuit (ASIC) or a programmable logic device (PLD), to enforce unidirectionality. Such a device may enforce unidirectionality entirely through hardware, by physically hardwiring the functionality, or through a combination of hardware and software using, for example, a configuration in which the hardware can only access software stored on a Read Only Memory (ROM) or Programmable ROM (PROM) that is not alterable by software or without accessing the internals of the device.

In another implementation, unidirectionality may be enforced by software on the secure computer (200) or on an intermediate computing platform. Such software could be developed using formal methods such as formally verifiable or high assurance instructions. However, there is always a risk that the software (or any other software on which it depends, such as an operating system) could contain a vulnerability which could be exploited by suitably crafted communications from the insecure computer (100). Thus, higher security approaches such as those described above are often preferred. It would not usually be considered appropriate for the unidirectionality to be enforced by software on the insecure computer (100), as this could be disabled or bypassed if the insecure computer (100) was compromised.

Described above are a number of embodiments with various optional features. It should be appreciated that, with the exception of any mutually exclusive features, any combination of one or more of the optional features are possible.

The invention claimed is:

1. A computer system for providing secure control of a computer, the system comprising an insecure computer and a secure computer:
    the insecure computer having a dedicated video output with a first hardware interface of the insecure computer, and configured to transmit, by the video output, a screen image of its operating system interface to the secure computer over a first connection, and to receive instructions for controlling the insecure computer from the secure computer over a second connection that connects to a second hardware interface of the insecure computer, different from the first hardware interface;
    the secure computer being configured to receive the video output of the insecure computer over the first connection and to transmit instructions for controlling the insecure computer over the second connection;
    the system further comprising a unidirectional dataflow enforcer configured to enforce unidirectional dataflow between the secure computer and the insecure computer, such that dataflow from the secure computer over the second connection to the insecure computer is allowed, but dataflow from the insecure computer to the secure computer over the second connection is prevented.

2. The system of claim 1, wherein the unidirectional dataflow enforcer is implemented using hardware.

3. The system of claim 2, wherein the unidirectional dataflow enforcer comprises an optical link, the optical link comprising transmission hardware coupled to the secure computer and receiving hardware coupled to the insecure computer.

4. The system of claim 3, wherein the transmission hardware comprises a laser.

5. The system of claim 2, wherein the unidirectional dataflow enforcer comprises an electronic transmission link and electronic transmission can only occur from the secure computer to the insecure computer.

6. The system of claim 5, wherein the electronic transmission link is one connection of a serial port link that uses different electrical connections for each direction of communication.

7. The system of claim 1, wherein the unidirectional dataflow enforcer is implemented in software.

8. The system of claim 7, wherein the software is executed on the secure computer.

9. The system of claim 7, wherein the system further comprises an intermediate computing platform and the software is executed on the intermediate computing platform.

10. The system of claim 1, wherein the unidirectional dataflow enforcer is a combination of hardware and software.

11. The system of claim 1, wherein the unidirectional dataflow enforcer is a custom electronic device.

12. The system of claim 11, wherein the unidirectional dataflow enforcer is a programmable logic device.

13. The system of claim 11, wherein the unidirectional dataflow enforcer is an application-specific integrated circuit.

14. The system of claim 1, wherein the secure computer is further configured to transmit the screen image of the operating system interface of the insecure computer to a second secure computer over a third connection, and to receive instructions for controlling the insecure computer from the second secure computer over the third connection.

15. The system of claim 14, wherein the secure computer is configured to compress the screen image before forwarding it to the second secure computer.

16. The system of claim 14, wherein the system comprises the second secure computer, the second secure computer configured to receive the screen image of the insecure computer from the secure computer over the third connection and to transmit instructions for controlling the insecure computer over the third connection.

17. The system of claim 1, wherein the dedicated video output with a unidirectional hardware interface is one of the following interface technologies: VGA, DVI, HDMI, DisplayPort or DSI.

18. The system of claim 1, wherein the unidirectional dataflow enforcer is configured to monitor the instructions transmitted over the second interface.

19. The system of claim 18, wherein monitoring the instructions transmitted over the second interface comprises producing a log of the instructions.

20. The system of claim 19, wherein the log of the instructions is transmitted to the secure computer over a dedicated interface.

21. The system of claim 1 wherein the instructions for controlling the insecure computer are user instructions input using one or more input devices.

22. The system of claim 1 wherein the insecure computer is further configured to transmit audio output to the secure computer over the first connection.

23. A secure computer, the secure computer being connected to an insecure computer over a first and second connection, wherein:
    the first connection connects to a dedicated video output with a first hardware interface of the insecure computer;
    the second connection connects to a second hardware interface of the insecure computer, different from the first hardware interface, to receive instructions for controlling the insecure computer, and is associated with a unidirectional dataflow enforcer configured to enforce unidirectional dataflow between the secure computer and the insecure computer, such that dataflow from the secure computer over the second connection to the insecure computer is allowed, but dataflow from the insecure computer to the secure computer over the second connection is prevented; and
    the secure computer is configured to receive a screen image of the operating system interface of the insecure computer over the first connection and to transmit instructions for controlling the insecure computer over the second connection.

24. An insecure computer, the insecure computer being connected to a secure computer over a first and second connection, wherein:

the insecure computer has a dedicated video output with a first hardware interface of the insecure computer, and transmits, by the video output, a screen image of its operating system interface to the secure computer over the first connection;

the insecure computer has a second hardware interface, different from the first hardware interface, that is coupled to the second connection and that receives instructions from the secure computer for controlling the insecure computer;

the second connection is associated with a unidirectional dataflow enforcer configured to enforce unidirectional dataflow between the secure computer and the insecure computer, such that dataflow from the secure computer over the second connection to the insecure computer is allowed, but dataflow from the insecure computer to the secure computer over the second connection is prevented; and the insecure computer is configured to receive the instructions from the secure computer and to carry out the instructions.

25. A method of securely controlling a computer comprising:

transmitting a screen image of the operating system interface of an insecure computer having a dedicated video output with a first hardware interface of the insecure computer, by the video output, to a secure computer over a first connection;

enforcing unidirectional dataflow between the secure computer and the insecure computer by allowing dataflow from the secure computer to the insecure computer over a second connection that connects to a second hardware interface of the insecure computer, different from the first hardware interface, and by preventing dataflow from the insecure computer to the secure computer over the second connection; and receiving, from the secure computer, at the insecure computer, over the second connection, instructions for controlling the insecure computer.

26. A method of operating an insecure computer using a secure computer, the secure computer being connected to the insecure computer over a first and second connection, the method comprising, at the secure computer:

receiving a screen image of the operating system interface of the insecure computer over a first connection that connects to a dedicated video output with a first hardware interface of the insecure computer; and transmitting instructions for controlling the insecure computer over the second connection, wherein the second connection connects to a second hardware interface of the insecure computer, different from the first hardware interface, to receive instructions for controlling the insecure computer, and is associated with a unidirectional dataflow enforcer configured to enforce unidirectional dataflow between the secure computer and the insecure computer, such that dataflow from the secure computer over the second connection to the insecure computer is allowed, but dataflow from the insecure computer to the secure computer over the second connection is prevented.

27. A method of operating an insecure computer using a secure computer, the insecure computer being connected to the secure computer over a first and second connection, the method comprising, at the insecure computer:

transmitting a screen image of the operating system interface of the insecure computer to the secure computer over the first connection using a dedicated video output with a first hardware interface of the insecure computer;

receiving, at a second hardware interface of the insecure computer, different from the first hardware interface, that is coupled to the second connection, instructions from the secure computer for controlling the insecure computer, wherein the second connection is associated with a unidirectional dataflow enforcer configured to enforce unidirectional dataflow between the secure computer and the insecure computer, such that dataflow from the secure computer over the second connection to the insecure computer is allowed, but dataflow from the insecure computer to the secure computer over the second connection is prevented; and execute the instructions received from the secure computer.

28. The system of claim 1, wherein the second hardware interface comprises a network interface that is configured to receive content from a server.

29. The system of claim 28, wherein the screen image is generated based at least in part on the content.

30. The system of claim 1, wherein the dedicated video output is configured so that software running on the insecure computer cannot affect signals transmitted over the first hardware interface.

31. The system of claim 30, wherein the signals transmitted over the first hardware interface are generated by a dedicated single function controller.

* * * * *